July 19, 1927.

E. E. PARTRIDGE

STRAINER

Filed Dec. 4, 1926

1,636,240

Inventor
Esther E. Partridge
Herbert E. Smith

By

Attorney

Patented July 19, 1927.

1,636,240

UNITED STATES PATENT OFFICE.

ESTHER E. PARTRIDGE, OF SPOKANE, WASHINGTON.

STRAINER.

Application filed December 4, 1926. Serial No. 152,593.

My present invention relates to an improved strainer or filter for use with culinary vessels, and while well adapted for various uses, is particularly designed as a kitchen article for use in restraining vegetables in a cooking vessel while straining or pouring off excess liquid or water from the vessel.

The strainer is semi-circular in shape; provided with a flat perforate body or strainer portion, and is equipped with a handle that renders it capable, of either right hand or left hand use in reversible position with relation to the vessel or sauce-pan.

Means are provided for guiding the strainer to proper position for use with relation to the vessel or pan with which it is to used, and for maintaining the strainer in this position after it has been applied in operative position, all as will hereinafter be more fully set forth and claimed.

The invention consists in certain novel features of construction and combinations and arrangements of parts, and the drawings illustrate one complete example of the physical embodiment of my invention wherein the parts are combined and arranged according to the best mode I have thus far devised for the practical application of the principles of my invention.

Figure 1:
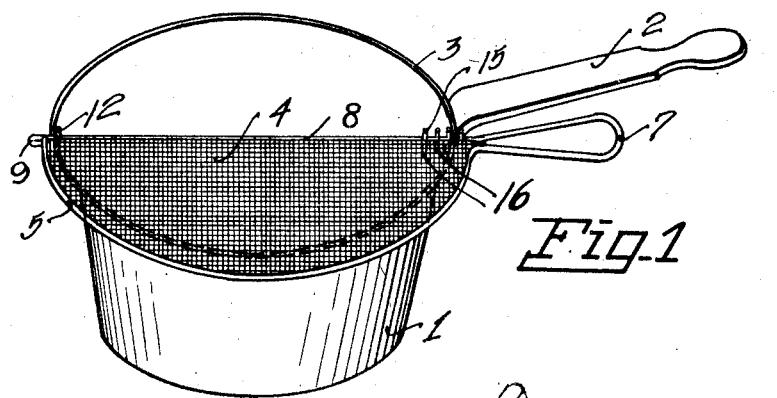
Figure 1 is a perspective view of the strainer of my invention showing its relation to the sauce-pan, but not in position for use.

In order that the general arrangement of parts and utility of the strainer may readily be understood I have shown a typical sauce-pan as 1 in Figure 1 having a handle 2 and the usual beaded ring or upper edge 3. The reversible strainer may be applied to the pan as indicated in Figure 1 and for straining the contents of the pan both the pan and strainer are turned toward the observer and the liquid poured through the strainer.

The body 4 of the strainer may be made up of perforated material or of wire screen as indicated in the drawings and this body is flat and semi-circular in shape so that it may be turned over or reversed on the pan with facility when required.

The curved edge of the body or strainer portion is bounded by a bow-shaped bar 5 which is fashioned with a groove 6 at its inner side to receive the edge of the screen and this edge is then clamped in the groove by pressing the walls of the groove together.

This curved bar is fashioned into a bent handle 7 which may be grasped by the hand that holds the pan handle 2, and from the handle 7 a straight bar 8 extends across the straight edge of the strainer, this edge also being retained in the groove in this bar.

Figure 2:
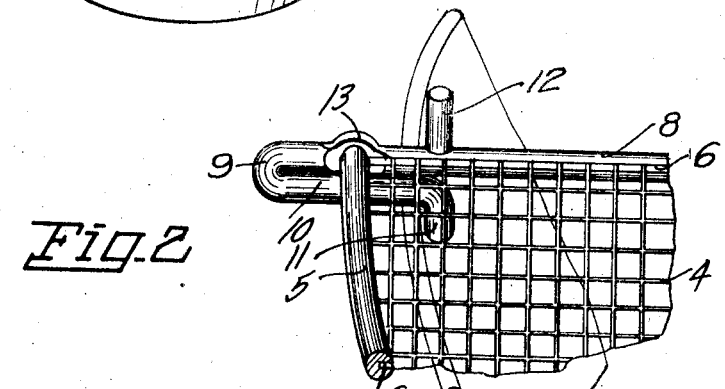
Figure 2 is an enlarged detail view partly in perspective at the outer end of the strainer showing guide lugs thereon for co-action with the edge of the pan or vessel.
Figure 3:
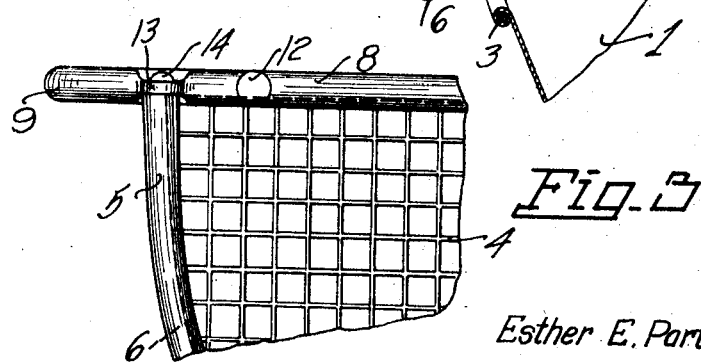
Figure 3 is a detail top plan view of the portion of the strainer shown in Figure 2.

At the outer end of the article the straight bar 8 terminates in a bend 9 beyond the bow-bar and beneath the straight bar 8 a short inward extension 10 is provided that terminates in an angularly disposed lug 11. Alined with this lug 11 is a second, complementary lug 12 which may be welded, soldered or otherwise secured to the straight bar and these two lugs that extend in opposite directions are alternately used as guides in co-action with the bead 3 of the sauce pan as indicated in Figure 2.

An integral flange 13 is pinched or struck up from the straight bar 8 and the flange is perforated to receive the end of the curved bar or bow which is riveted in the perforated flange as at 14.

On the straight bar 8 near its handle-end are arranged two series of pins 15 and 16 the pins of the series being spaced apart and arranged in alinement. Two adjoining pins of either series may be used to engage the beaded edge of the sauce pan and these pins, together with one or the other of the lugs 11 and 12 are utilized to retain the strainer in position against the edge of the sauce pan when the latter is tilted with the strainer.

The strainer may thus be held in vertical position to form a retainer for the vegetable or other contents of the pan, and permit the liquid to be poured or strained through its perforated body, in manner that will be understood.

Having thus fully described my invention what I claim as new and desire to secure by Letters Patent is—

1. A reversible strainer of semi-circular shape having a binding frame of a single piece of wire and fashioned with an integral handle, a pair of oppositely projecting guide lugs at the outer end of the binding frame adapted for alternate use with the edge of a sauce pan, and one of said lugs being formed as the terminus of the wire.

2. A reversible strainer of semi-circular shape having a grooved binding frame and a perforated body having its edges secured in the grooved binding frame, an integral handle on the frame, a pair of oppositely projecting guide lugs at the outer end of the frame, and two series of oppositely extending guide pins near the handle end of the frame, for co-action with the beaded edge of a pan.

In testimony whereof I affix my signature.

ESTHER E. PARTRIDGE.